(12) United States Patent
Trigger et al.

(10) Patent No.: US 11,271,941 B2
(45) Date of Patent: *Mar. 8, 2022

(54) DEVICE MANAGEMENT SYSTEM

(71) Applicant: Family Zone Cyber Safety Ltd, Perth (AU)

(72) Inventors: Benjamin Shaun Dixon Trigger, Belmont (AU); Timothy David Levy, Subiaco (AU); Paul Russell Robinson, Floreat (AU)

(73) Assignee: Family Zone Cyber Safety Ltd, Perth (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/566,756

(22) Filed: Sep. 10, 2019

(65) Prior Publication Data

US 2020/0007552 A1 Jan. 2, 2020

Related U.S. Application Data

(63) Continuation of application No. 15/286,434, filed on Oct. 5, 2016, now Pat. No. 10,462,149, which is a
(Continued)

(30) Foreign Application Priority Data

Apr. 8, 2014 (AU) ................................ 2014100338
Sep. 10, 2014 (AU) ................................ 2014903609

(51) Int. Cl.
*H04L 29/06* (2006.01)
*H04W 12/08* (2021.01)
(Continued)

(52) U.S. Cl.
CPC ............ *H04L 63/102* (2013.01); *H04L 47/70* (2013.01); *H04L 63/0227* (2013.01);
(Continued)

(58) Field of Classification Search
CPC ... H04L 63/102; H04L 47/70; H04L 63/0227; H04L 63/20; H04L 67/10; H04L 67/1002; H04L 67/02; H04W 12/08
See application file for complete search history.

(56) References Cited

U.S. PATENT DOCUMENTS 7,526,541 B2 4/2009 Roese et al.
7,739,372 B2 6/2010 Roese et al.
(Continued)

FOREIGN PATENT DOCUMENTS

| WO | 2006093917 A2 | 9/2006 |
| WO | 2013124602 A1 | 8/2013 |
| WO | 2014009777 A1 | 1/2014 |

OTHER PUBLICATIONS

International Preliminary Report on Patentability dated Aug. 3, 2016 in International Application No. PCT/AU2015/000212. 6 pages.
(Continued)

*Primary Examiner* — Shawnchoy Rahman
(74) *Attorney, Agent, or Firm* — Kilpatrick Townsend & Stockton LLP

(57) ABSTRACT

A system comprises a policy storage separately located relative to the user device, the policy database arranged to store information indicative of at least one usage policy set applicable to at least one respective user device. The system is arranged to store user device identification information for each user device associated with the system, the user device identification information being indicative of and unique to a user device associated with the system and being stored separately relative to the user device. The system is also arranged to associate a usage policy set with a user device using the device identification information unique to the user device. The system is also arranged to determine a usage
(Continued)

request from a user device and to allow or deny the usage request based on the at least one usage policy set associated with the user device.

32 Claims, 12 Drawing Sheets

Related U.S. Application Data continuation of application No. PCT/AU2015/000212, filed on Apr. 8, 2015.

(51) Int. Cl.
*H04L 67/1001* (2022.01)
*H04L 47/70* (2022.01)
*H04L 67/10* (2022.01)
*H04W 12/71* (2021.01)
*H04W 12/72* (2021.01)
*H04L 67/02* (2022.01)
*H04L 67/53* (2022.01)

(52) U.S. Cl.
CPC ............ *H04L 63/20* (2013.01); *H04L 67/10* (2013.01); *H04L 67/1002* (2013.01); *H04W 12/08* (2013.01); *H04L 67/02* (2013.01); *H04L 67/20* (2013.01); *H04W 12/71* (2021.01); *H04W 12/72* (2021.01)

(56) References Cited

U.S. PATENT DOCUMENTS

| | | | |
|---|---|---|---|
| 7,810,137 B1 | 10/2010 | Harvey et al. | |
| 8,200,818 B2* | 6/2012 | Freund | H04L 63/145 |
| | | | 709/225 |
| 8,677,450 B2* | 3/2014 | Lum | H04L 63/0876 |
| | | | 726/1 |
| 9,369,299 B2* | 6/2016 | Dupont | H04L 12/2876 |
| 9,692,878 B1* | 6/2017 | Rosenthal | H04M 1/72577 |
| 2006/0120526 A1 | 6/2006 | Boucher et al. | |
| 2007/0109983 A1 | 5/2007 | Shankar et al. | |
| 2008/0040773 A1 | 2/2008 | AlBadarin et al. | |
| 2009/0049518 A1* | 2/2009 | Roman | H04L 41/0893 |
| | | | 726/1 |
| 2009/0187968 A1 | 7/2009 | Roese et al. | |
| 2010/0188992 A1 | 7/2010 | Raleigh | |
| 2010/0192212 A1* | 7/2010 | Raleigh | H04W 28/12 |
| | | | 726/7 |
| 2013/0139221 A1* | 5/2013 | Gundavelli | H04W 28/02 |
| | | | 726/4 |
| 2013/0309971 A1* | 11/2013 | Kiukkonen | H04W 12/003 |
| | | | 455/41.2 |
| 2014/0026179 A1 | 1/2014 | Devarajan et al. | |
| 2014/0118155 A1 | 5/2014 | Bowers et al. | |
| 2014/0195681 A1 | 7/2014 | Chan et al. | |

OTHER PUBLICATIONS

International-Type Search Report dated Nov. 6, 2014 in AU Patent Application 2014903609. 7 pages.
Extended European Search Report dated Nov. 3, 2017 in EP Patent Application No. 15777063.7. 8 pages.
Non-Final Office Action dated Jun. 26, 2018 in U.S. Appl. No. 15/286,434, filed Oct. 5, 2016. 22 pages.
Final Office Action dated Jan. 4, 2019 in U.S. Appl. No. 15/286,434, filed Oct. 5, 2016. 24 pages.
Notice of Allowance dated Jun. 19, 2019 in U.S. Appl. No. 15/286,434, filed Oct. 5, 2016. 10 pages.
Office Action dated May 25, 2021 in CA Patent Application No. 2,944,923. 4 pages.
Extended European Search Report dated Nov. 29, 2021 in EP Patent Application No. 21173083.3. 12 pages.

* cited by examiner

DEVICE MANAGEMENT SYSTEM

CROSS-REFERENCES TO RELATED APPLICATIONS

This application is a continuation application of U.S. patent application Ser. No. 15/286,434 entitled "DEVICE MANAGEMENT SYSTEM," filed on Oct. 5, 2016, which is a continuation application of International Patent Application No. PCT/AU2015/000212 entitled "A DEVICE MANAGEMENT SYSTEM," filed on Apr. 8, 2015, which claims priority to Australian Patent Application No. 2014903609, filed on Sep. 10, 2014, and Australian Patent Application No. 2014100338, filed on Apr. 8, 2014, which are herein incorporated by reference in their entirety for all purposes.

The present invention relates to a device management system for managing usage of network enabled devices such as smart phones, tablet computers and personal computers, and to a method of managing usage of such devices.

BACKGROUND OF THE INVENTION

The proliferation of network enabled devices including smart phones, tablet computers and personal computing devices has revolutionised the way people communicate, shop, and consume media and entertainment. Whilst such devices provide many benefits to users, they also present challenges in that users are able to access material that may be considered inappropriate for them. In addition, users are able to use applications and features of the devices with little or no restriction and this may be undesirable, particularly for children.

It is known to restrict the availability of material on a network enabled device using "Internet filtering" techniques. Such Internet filtering techniques can be applied at a network level such that an Internet service provider or administrator of a local network incorporates a network filter applicable to all devices that access the network. Internet filtering may also take the form of a client filter that is applied at a device level through installation of software on the device.

While a large range of client software is available, it is difficult to apply and manage the client software across all desired devices. This is because of the complexity and limitations of client software, the difficulty that non-technical users may experience installing and maintaining the software on all desired devices, the lack of standardised client software that is applicable across all device platforms, and the relative ease with which skilled users can circumvent installed software.

In addition, existing systems for managing device usage do not adequately provide control over usage of applications and features of the devices.

BRIEF SUMMARY OF THE INVENTION

In accordance with a first aspect of the present invention, there is provided a system for managing usage of at least one network enabled device, the system comprising: a policy storage separately located relative to the user device, the policy storage arranged to store information indicative of at least one usage policy set applicable to at least one user device, each usage policy set defining usage permissions and/or usage restrictions for a user device; the system arranged to store user device identification information for each user device associated with the system, the user device identification information being indicative of and unique to a user device associated with the system and being stored separately relative to the user device; the system arranged to associate a usage policy set with a user device using the device identification information unique to the user device; and the system arranged to determine a usage request from a user device and to allow or deny the usage request based on the at least one usage policy set associated with the user device.

In an embodiment, the information indicative of and unique to at least one user device associated with the system includes a MAC address, a SIM card number, an IMEI number or a mobile telephone number of the user device.

In an embodiment, the information indicative of and unique to at least one user device associated with the system includes a static IP address assigned to the user device.

In an embodiment, the information indicative of usage permissions and/or usage restrictions includes information indicative of Internet usage, applications usage, and/or user device features usage. The information indicative of applications usage may include information indicative of usage permissions and/or usage restrictions applicable to social networking applications, and/or communication applications such as SMS or phone call applications. The information indicative of device features usage may include information indicative of usage permissions and/or usage restrictions applicable to a camera on the user device, a screen capture feature of the user device and/or an in-app purchasing feature on the user device.

In an embodiment, at least one usage policy set defines usage permissions and/or usage restrictions based on defined time periods such that different usage permissions and/or usage restrictions apply at different time periods. The defined time periods may correspond to days of a week and/or times in a day.

In an embodiment, at least one usage policy set defines usage permissions and/or usage restrictions based on age or analogous classification such as maturity level or school year of a user associated with the user device.

In an embodiment, the system includes a plurality of different predefined usage policies, and the system is arranged to enable an authorised user to select at least one usage policy from the predefined usage policies to form a defined usage policy set to be associated with a user device. The predefined usage policies may be grouped in usage policy families according to usage permission and/or usage restriction characteristics.

In an embodiment, the system is arranged to enable an authorised user to select at least one user, and to apply the or each selected usage policy to all user devices associated with the user.

In an embodiment, the system is arranged to enable an authorised user to select at least one location zone, group of users or group of user devices associated with the authorised user, and to apply the or each selected usage policy to all user devices in the location zone, group of users or group of user devices associated with the user.

The location zone may correspond to a residence such that user devices in the location zone are user devices disposed at the residence.

In an embodiment, in response to modification of a selectable predefined usage policy, the system automatically applies the modified predefined usage policy such that for a usage policy set associated with a user device that includes the predefined usage policy, the modified predefined usage policy is used to make a determination as to whether to allow or deny the usage request.

In an embodiment, the system is arranged to enable an authorised user to modify a selected usage policy and, in response to modification of a selected usage policy by the authorised user, the system does not automatically apply the modified usage policy to other user devices.

The system may be arranged to enable a user to define and/or modify usage policies by accessing the system from a remote location.

In an embodiment, the system includes a web server and the system is arranged to enable a user to define and/or modify usage policies by accessing a web page served to the user by the web server.

In an embodiment, administrator users and non-administrator users are defined, each administrator user being permitted to define and/or modify usage policies for at least one defined user device, and each non-administrator user not being permitted to define and/or modify usage policies.

In an embodiment, at least one user device has multiple defined user policy sets that are selectable for use with the user device to determine whether to allow or deny a usage request, and the system is arranged such that the usage policy set to be used with a user device is selected based on defined criteria.

In an embodiment, the system is arranged to communicate with a cloud filter arranged to make decisions in relation to usage permissions and/or usage restrictions for a user device according to the at least one usage policy applicable to the user device and according to usage rules stored at the cloud filter. The usage rules may define website addresses.

In an embodiment, the system includes an access point arranged to facilitate access to a wide area network, the access point arranged to enforce usage permissions and/or usage restrictions for a user device according to the at least one usage policy associated with the user device.

In an embodiment, the access point is arranged to identify a user device based on the information indicative of and unique to the user device, and to use the at least one usage policy stored for the user device to enforce the usage permissions and/or usage restrictions for the user device.

In an embodiment, the usage policy set to be used with the user device is selected based on the access point.

In an embodiment, the system includes a policy server, the policy server including the policy storage and the policy server arranged to communicate with the cloud filter in order to obtain usage decisions based on the usage policies for the user device and usage rules stored at the cloud filter.

In an embodiment, the access point is arranged to generate a request for a decision in relation to a usage request from a user device connected to the access point, the access point is arranged to communicate the usage request to the policy server, the policy server is arranged to communicate the usage request to the cloud filter, and the system is arranged to communicate a decision in response to the usage request to the access point.

In an embodiment, the access point is arranged to store information indicative of decisions already made in relation to usage permissions and/or usage restrictions for a user device, and to apply the stored decisions to subsequent usage requests from the user device. The system may be arranged such that the stored decisions expire after a defined period of time that may be dependent on a current applicable usage policy.

In an embodiment, the access point is arranged to contact the policy storage and in response the system is arranged to determine whether to expire the stored decisions.

In an embodiment, the system includes an access point server arranged to store settings for the access point remotely of the access point, and to communicate the stored settings to the access point for storage at the access point.

In an embodiment, the defined usage policies include a safety net policy that defines the minimum access restrictions to a wide area network to be applied by the access point for user devices connected to the access point and associated with the system but not associated with the access point. For instance, the system may be arranged to only apply the safety net policy where users' policies for internet access on a particular access point are being governed by a third party (for example the parent of a guest on an access point).

In an embodiment, the defined usage policies include a guest policy that defines the access permissions and/or restrictions to a wide area network to be applied by the access point for user devices connected to the access point that are not registered with the system.

In an embodiment, the system includes a controlled user device, the controlled user device including a usage control application arranged to communicate network access requests to the cloud filter.

In an embodiment, the usage control application is arranged to make decisions in relation to usage of applications installed on the user device and/or features of the user device based on the usage policy for the user device. The applications may include social networking applications and/or communication applications. The device features may include a device camera, a screen capture feature and/or an in-app purchasing feature.

The controlled user device may be arranged to instigate a VPN connection when the controlled user device requests access to a wide area network.

In an embodiment, the system includes a device server arranged to store settings for the controlled user device remotely of the controlled user device, and to communicate the stored settings to a controlled user device for storage at the controlled user device, the stored settings including information indicative of at least one usage policy for the controlled user device.

In an embodiment, a user device may include a location manager arranged to determine the location of a user device and store location information indicative of device location, for example at the device server. The location manager may include a GPS device.

In an embodiment, the location information may be used by the system to provide location related functions, for example that determine the current or previous location of a user associated with a user device, and/or track the movements of a user, and/or send a communication to a user device or to an authorised user when the user reaches a defined location or does not reach a defined location by a defined time, and/or that provide defined functionality such as whether to allow or deny particular device usage based on location.

In an embodiment, the device server is arranged to monitor the controlled user device to ensure that the usage control application remains operational and has not been uninstalled.

In an embodiment, the system includes a controlled mobile network, the system arranged to allocate a static IP address to a user device and to communicate the static IP address to the cloud filter, the cloud filter enforcing usage permissions and/or usage restrictions for the user device according to the at least one usage policy applicable to the user device identified using the static IP address.

In accordance with a second aspect of the present invention, there is provided a method of managing usage of at least one network enabled user device, the method comprising: storing information indicative of at least one usage policy set applicable to at least one user device separately relative to the user device, each usage policy set defining usage permissions and/or usage restrictions for a user device; storing user device identification information for each user device separately relative to the user device, the device identification information being indicative of and unique to a user device; associating a usage policy set with a user device using the device identification information unique to the user device; determining a usage request from a user device; and allowing or denying the usage request based on the at least one usage policy set associated with the user device.

In accordance with a third aspect of the present invention, there is provided an access point for facilitating access by at least one network enabled user device to a wide area network and managing usage of the user device, the access point comprising: a filter arranged to allow or deny a usage request from a user device according to a usage policy set associated with the user device, the usage policy set defining usage permissions and/or usage restrictions for the user device; the access point communicating with a policy storage arranged to store information indicative of at least one usage policy set applicable to at least one user device, each user device associated with a usage policy set using user device identification information unique to the user device; and the access point arranged to determine the user device identification information of a user device when the user device connects to the access point; wherein the filter is arranged to allow or deny the usage request based on the usage policy set associated with the user device identification information.

BRIEF DESCRIPTION OF THE DRAWINGS

The present invention will now be described, by way of example only, with reference to the accompanying drawings, in which.

DESCRIPTION OF AN EMBODIMENT OF THE INVENTION

Figure 1:
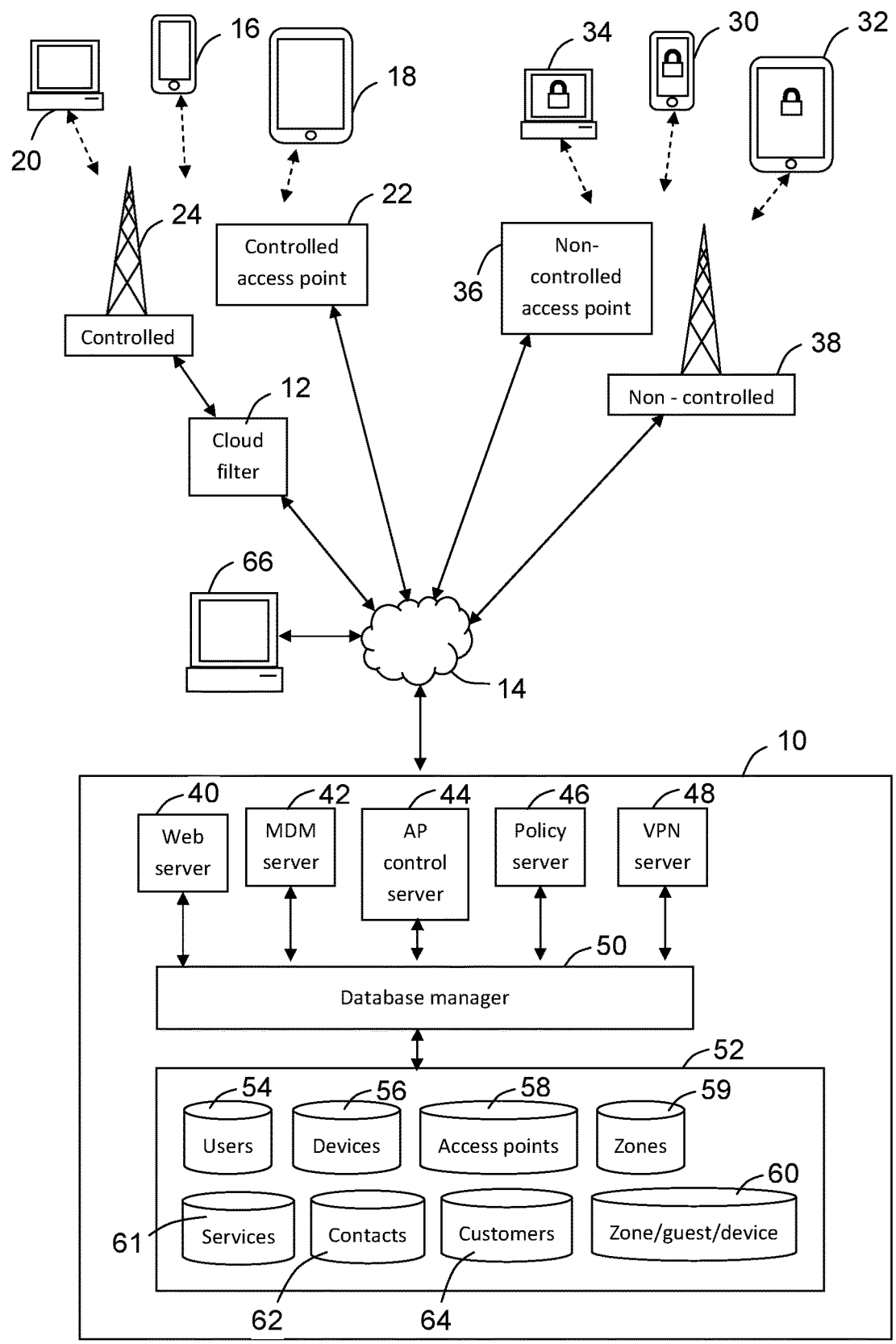
FIG. 1 is a block diagram of a device management system in accordance with an embodiment of the present invention.

Referring to FIG. 1 of the drawings, a device management system for managing network access and device usage is shown. In the present example, the device management system is configured to manage device access to the Internet, and to manage usage of device features such as a device camera, and manage usage and installation of applications on devices, such as usage of communications applications such as text, phone and email on the devices. However, it will be understood that any control and/or management of device usage is envisaged.

The device management system includes a device control platform 10 arranged to manage and control operation of the system, and in particular to store information indicative of access permissions in the form of usage policies for each device associated with the system, and manage dissemination and enforcement of the usage policies for all of the devices.

The device management system 10 connects to a cloud filter 12 through a wide area network 14, in this example that includes the Internet, the cloud filter 12 storing a plurality of access rules indicative of access rights for Internet sites. The cloud filter 12 stores information indicative of network locations, such as Internet domains, and makes a decision as to whether access should be allowed or denied based on a request to access interne content and the relevant access policy currently applicable to the requesting user device. In this example the cloud filter is managed by a third party.

The system is configured for use with non-controlled user devices, being devices such as for example a smart phone 16, a tablet computer 18 or a personal computing device 20 which do not have an installed usage control application.

The non-controlled user devices 16, 18, 20 are provided with device usage control through a controlled access point 22 or a controlled mobile network 24, as described in more detail below.

The system also operates with controlled user devices, in this example a smart phone 30, a tablet computer 32 or a personal computing device 34, the controlled user devices including client software that is managed by the device control platform 10 and arranged to provide device usage control including network access control and/or control of usage of applications and/or features on the controlled user devices 30, 32, 34.

It will be understood that since each device that is associated with the system either has a usage control application installed on the device or the device accesses the wide area network 14 through a controlled access point 22 or a controlled mobile network 24, a degree of device usage control is always present for each device.

The device control platform 10 essentially constitutes a back end system that may be disposed remotely from other components of the system. The device control platform 10 includes a web server 40 arranged to serve web pages to a user on request. In particular, the web pages are used by an authorised administrator to manage the respective levels of usage provided to devices associated with the system, including allocating and modifying the usage policies that define the permitted levels of network access, device applications usage and device features usage available to the user of each device.

In the present example, the respective levels of device usage provided to users of devices is managed by selecting predefined usage policy sets, and modifying the selected usage policies as appropriate, as described in more detail below.

The device control platform 10 also includes a mobile device management (MDM) server 42 that manages the controlled user devices 30, 32, 34, in particular so that the access control software installed on the controlled user devices is up to date, and monitors the controlled user devices 30, 32, 34 to ensure that the access control software remains operational and has not been uninstalled.

The device control platform 10 also includes an access point control server 44 arranged to manage setup and operation of controlled access points 22; a policy server 46 that stores default usage policies that are selectable and customisable by an authorised administrator, stores the usage policies that have been selected and/or created by the administrator for devices under control of the administrator, and determines the appropriate access policy to apply to each user request.

The device control platform 10 also includes a virtual private network (VPN) server 48 arranged to establish and manage VPN sessions with controlled user devices 30, 32, 34 through the wide area network 14, typically the Internet.

The device control platform 10 also includes a database manager 50 arranged to manage data stored in shared databases 52. In this example, the shared databases 52 include a users database 54 for storing information indicative of users of the device management system; a devices database 56 that stores information indicative of user devices associated with the system, including information unique to the user devices such as MAC addresses, IP addresses and/or mobile service numbers; an access point database 58 arranged to store information indicative of controlled access points that are registered with the system and associated with a respective administrator; a zone database 59 arranged to group access points into logical organisations according to, for example, a residence or multi-dwelling facility wherein the same policy structure is desired to be applied across all dwellings; a zone/guest/device database 60 arranged to store instances of each user and user device which have been active in a zone and any associated custom policies set by the administrator of the zone for the user or user device such as internet blocking or connection alerts; a services database 61 arranged to store information indicative of services available to a user device that accesses the device control platform 10; a contacts database 62 arranged to store information indicative of contacts for each user device, for example so that usage policies can be created that are dependent on the contacts, such as for the purpose of preventing or restricting texts, phone calls or email; and a customers database 64 arranged to store information indicative of customers of the system, also referred to as administrators of the system, that manage accessibility by user devices associated with the administrator.

The device control platform 10 is accessible by an administrator for the purpose of defining and/or modifying usage policies for devices in the family of user devices with which the administrator is associated, and in this example the administrator accesses the web server 40 for this purpose using an administrator terminal 66 that may be a personal computing device.

Figure 2:
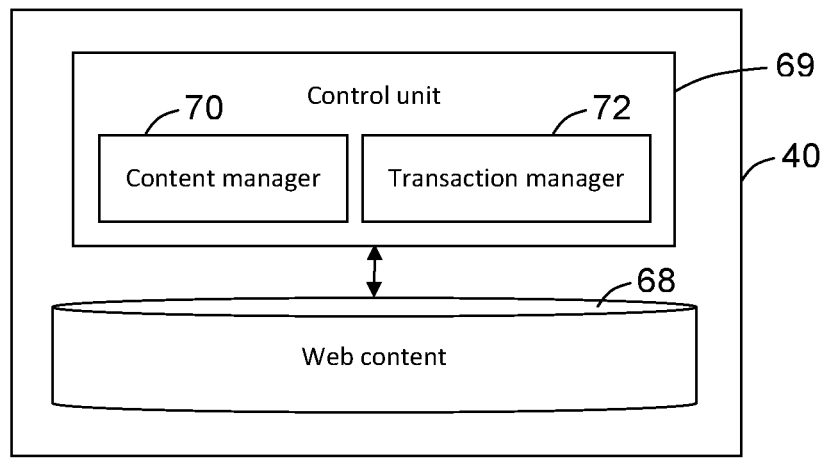
FIG. 2 is a block diagram of a web server of the device management system shown in FIG. 1.

Referring to FIG. 2, the web server 40 is shown diagrammatically.

The web server 40 includes a web content database 68 arranged to store content that forms the basis of a website served to an administrator by the web server 40, and a control unit 69 arranged to control and coordinate operations in the web server 40. In this example, the control unit 69 implements a content manager 70 arranged to manage display of web content from the web content database 68 on a web page served to the administrator.

The control unit 69 also implements a transaction manager 72 arranged to manage actions that an administrator is able to carry out using the website, including creation of new accounts, modification of existing accounts including modification of usage policies applicable to the family of devices associated with the administrator, and registration of new devices and/or controlled access points with the system. In order to create and/or modify an account associated with an administrator, the administrator accesses the configuration web page, for example using a web browser. The administrator would typically be identified and granted access to the website based on positive identification, for example through login and password authentication.

Figure 3:
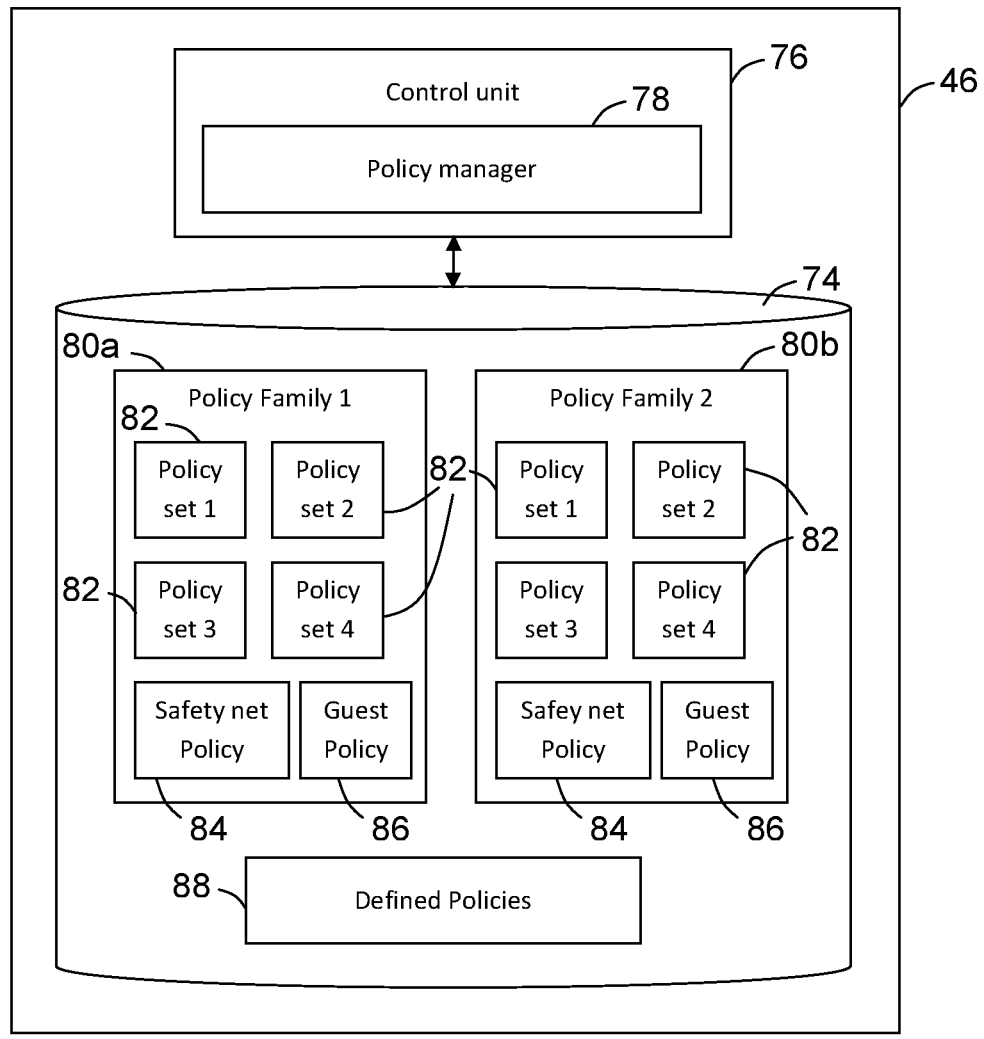
FIG. 3 is a block diagram of a policy server of the device management system shown in FIG. 1.

Referring to FIG. 3, the policy server 46 is shown diagrammatically.

The policy server 46 includes a policies database 74 arranged to store default policy families, default policy sets, and policy sets that have been defined for each user device of a family of user devices by the relevant administrator.

The policy server 46 also includes a control unit 76 arranged to control and coordinate operations in the policy server 46, the control unit in this example implementing a policy manager 78 arranged to interface with the policy database 74, add new usage policies and implement changes to usage policies in response to an administrator request, identify user devices and determine the appropriate policy in the policy database 74 to apply to the user device, communicate with the cloud filter 12, and communicate with the user devices.

In this example, each usage policy comprises control settings defining the level of access permitted to Internet sites and content, the level of usage allowed of device applications including communication applications such as email or SMS, and the level of allowed usage of device features such as of a device camera. At least some usage policies in a usage policy family may be time and/or day specific such that the usage policies define the level of permitted device usage according to defined time periods, for example such that for children access to the Internet, to SMS and other communication applications and to a device camera is denied during school time, study time and bed time.

In this example, default policy families are usage policy sets created to support the particular needs of a particular user group, such as a religious group or a school community. Each policy set defines different usage rules, or different levels of usage rights, for example a policy set may be specific to a particular age group, maturity level or school year or define a high, low or medium level of access restriction.

For example, a policy family may be specific to a religious affiliated organisation such as Catholic Education, and may include the following policy sets:

Pre-school policy set
Junior primary policy set
Senior primary policy set
Junior High School policy set
Senior High School policy set
Young Adult policy set
Adult policy set
No restrictions policy set
Safety net policy set Each policy set may include different policies for different situations, for example the pre-school policy set may include policies specific to different defined periods, for example:

School time policy
Sleep time policy
Study time policy
Play time policy

For example, for a pre-school age child, an administrator, such as a parent, is able to select a pre-school policy set within a defined Catholic Education policy family, and the system is arranged to apply the relevant policy to the child's device according to the current applicable time period. In this way, usage of the child's device is controlled and managed according to the wishes of the parent administrator.

In a particular example, the school time policy may include the following usage rules:

Policy Family: Catholic Education
Policy Set: Catholic Education—Junior Primary School
   Time Period Policy: School Time
      Rule: Block Domain Category: Pornography
      Rule: Disable Feature: Camera
      Rule: Disable App Category: Facebook
      Rule: Blacklist: *Facebook*

When an administrator, typically a parent, desires to configure access rights for a family of user devices, the administrator selects the preferred policy family and policy sets within the selected policy family that correspond to the level of usage control desired for the proposed users, typically family members. The policy family and associated policy sets that belong to the policy family are linked together such that modification of the policy family by operators of the system causes the policy sets within the policy family to also be updated as required. In addition, in this example, the system is arranged such that modifications made to selectable default policies, policy sets and policy families by operators responsible for defining and maintaining the policies, policy sets and policy families are automatically also applied to the user devices for which the policies, policy sets and policy families have been selected. In this way, amendments to policies are automatically applied to the subscribers of the policies.

An administrator is also able to change usage rules contained within a selected policy set, and the system is then arranged to lock the change so as to prevent subsequent changes made at the family policy level by operators of the system from propagating. For example, a parent may choose to permit a smartphone's camera to be used or a specific URL to be accessed by a pre-school age child during school time by modifying a policy in the selected pre-school policy family that relates to camera use, even though the camera use policy contained within the default pre-school policy family selected for the child does not allow camera use during school time. After making this decision to customise the camera use policy for pre-school children, changes to the camera use policy in the default pre-school family policy by operators of the system will not propagate to the camera use policy that was modified by the administrator.

An administrator is also able to select a safety net policy that defines particular Internet access restrictions that the administrator wishes to apply at a controlled access point for users of the controlled access point that have associated usage policies determined by others, for example a guest on the access point that has an associated usage policy set chosen by the guest's parent. The safety net policy applies in addition to the selected policy set(s) assigned to a particular user device. Accordingly, the policies applied to registered user devices are determined by the relevant administrator associated with the user devices (eg the user's parent) whereas the safety policy is applied by the owner of the access point. Safety net policies are included in a family policy and may be customised by the administrator. Any policy set within a chosen policy family can be the safety net policy. For example, an administrator may select the pre-school policy set as the safety net policy, or use the recommended safety net policy set of the selected policy family Catholic Education. The safety net policy ensures that a user device connecting to the Internet using a first administrator's access point and registered with the system but to a different second administrator (and therefore subject to another administrator's policies) is not permitted to access Internet sites that the first administrator considers unacceptable using the first administrator's home network.

An administrator is also able to select a default guest policy that will apply to all unknown devices that connect to a controlled access point 22. The default guest policy serves to allow unknown devices to obtain Internet access at the level the administrator is comfortable with. Any policy set within a chosen policy family can be the guest policy set. For example, an administrator may select the pre-school policy set as the guest policy set. The selected guest policy set is then applied for any unregistered user devices that access the Internet on the administrator's network.

As shown in FIG. 3, the policies database 74 includes several policy families 80A, 80B that respectively define different general device usage characteristics depending on the characteristics of the users of the family of devices, for example whether the users are part of a particular community group such as a religious organisation, a school environment, or because the user group includes several young children.

Each policy family 80 includes several defined policy sets 82 that are selectable by an administrator in order to further specify the particular usage restrictions that will apply to each user device and therefore each particular user. For example, a first policy set 82 may be appropriate for children under the age of 12 and a second policy set 82 may be applicable for children between 12 and 15.

Each policy family 80 also includes a safety net policy 84 and a guest policy 86, each of which is also selectable by the administrator and modifiable as necessary by the administrator.

After selection of the policy family 80 and the required policy sets 82 for the family of user devices, the defined policies for the user devices associated with the administrator are stored in the policies database 74 as defined policies 88.

In practice, a policy family and/or particular policy sets can be selected for application to all user devices associated with a family, that is, all user devices that are associated with a particular administrator, and a policy family and/or particular policy sets can be selected for application to particular users or particular user devices. If a policy family and/or particular policy sets are selected for a family of user devices, sub-group of users, particular selected user(s) or subgroup of user devices, then the relevant access policies of the policy family and/or particular policy sets propagate down to the user devices associated with the family of user devices, sub-group of users, particular user(s) or subgroup of user devices. In an example, if a modification is made to the policy family or any of the defined policy sets by an operator associated with the system, for example a creator of and/or person responsible for maintaining the policies defined by the policy family and/or defined policy sets, then the modifications automatically propagate down to the relevant user devices that are subscribed to the policy family and/or defined policy sets. However, propagation in this way does not occur for a policy if an administrator has manually modified one or more settings for the policy.

While each user device is associated with a set of one or more defined usage policies, the system may be arranged such that the usage policy set to be used with a user device varies based on defined criteria. For example, the usage policy set to be used with a user device may be different depending on which controlled access point 22 is used to access the wide area network 14 (the Internet).

For example, if a child has parents that live separately, a first usage policy set may be defined for a user device associated with the child when the user device accesses the Internet through a first controlled access point 22 at the residence of a first parent, and a second usage policy set may be defined for the user device associated with the child when the user device accesses the Internet through a second controlled access point 22 at the residence of a second parent. With this arrangement, the first parent may be permitted to define and modify the first usage policy set and the second parent may be permitted to define and modify the second usage policy set, for example through the configuration web page made available by the web server 40.

In this way, it is possible for a user device associated with a user to have 2 different defined usage policy sets, for example with the policy set to be applied determined according to the location of the user and the different usage policy sets managed by different administrators.

In a further variation, the system may be arranged such that the usage policy set defined for a user device may be overridden, for example for a defined period of time, by a user different to the user associated with the user device. With this variation, if a user not associated with a user device attempts to use the user device, but the user is prevented from doing so because of the usage policy set defined for the user device, the system may be arranged to allow the use if the user is authenticated.

For example, if a first user attempts to access a website on a user device that belongs to a second user, and the website is not allowed by the usage policy set associated with the user device, the first user is prevented from accessing the website and is presented with an option to 'borrow' the user device. In order to do so, the first user identifies him/her self, for example by activating a predefined icon or representation associated with the first user and displayed on the user device and entering a password or PIN number. The system then applies the policy set associated with the first user for a defined period, for example 1 hour.

In this way, a user is able to use a user device associated with another user within the policy set defined for the user, and not the policy set defined for the user device, for a temporary period of time.

Figure 4:
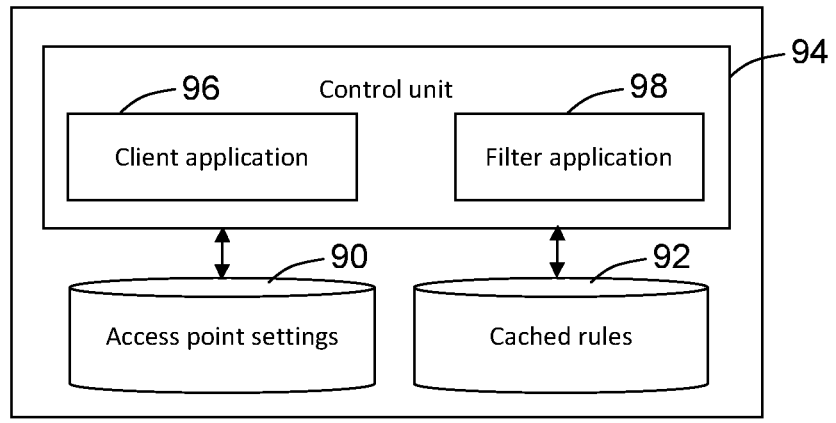
FIG. 4 is a block diagram of a controlled access point of the device management system shown in FIG. 1.

Referring to FIG. 4, a controlled access point 22 is shown diagrammatically.

The controlled access point 22 is an access point that facilitates access to the wide area network 14 (typically the Internet) wirelessly, and is also equipped with components that enable the controlled access point 22 to apply access restrictions to connected user devices according to the defined usage policies 88 stored in the policy server 46.

The controlled access point 22 in this example includes cached rules 92 that correspond to usage restrictions previously enforced for user devices that have already connected to the controlled access point 22. In this way, the controlled access point 22 is able to quickly and efficiently apply an access policy to a request from a user device if the access policy has been applied previously. The cached rules 92 may be updated as necessary according to the defined policy sets assigned to a user device, or an expiration time may be allocated to the rules to coincide with a time period associated with a policy. For example, a selected policy for a user device may define a school time policy that covers the period 8 am-3 pm, and the cached policy for the user device set so as to expire at 3 pm.

The controlled access point 22 also stores access point settings 90 that define conventional settings for a wireless access point, such as WiFi security settings, modem settings, and so on.

The controlled access point 22 also includes a control unit 94 that controls and coordinates operations in the controlled access point 22, and in particular implements a client application 96 arranged to communicate with the access point control server 44 in order to manage configuration and firmware updates of the controlled access point 22, and to record usage statistics.

The controlled access point 22 also includes a filter application 98 arranged to identify user devices that wirelessly connect to the controlled access point using a unique identifier associated with the user device, for example using a MAC address, a SIM number or an IMEI number, or any other information that is unique to the user device. The filter application 98 also monitors data passing between the user device and the controlled access point 22, enforces restrictions defined in the cached rules 92 or communicated to the controlled access point 22 in decisions from the policy server 46, and stores changes to the cached rules 92 as necessary, for example because a restriction has been enforced on a user device for the first time by the controlled access point 22.

The controlled access point 22 may be arranged to enable a user to override the policy defined for a user device and apply a policy set of another user not associated with the user device for a defined period of time by entering authentication details of the other user. In this example, the access point periodically contacts the policy server and the policy server recognises that a user wishes to borrow the connected device and thereafter applies the access policies of the borrowing user.

Figure 5:
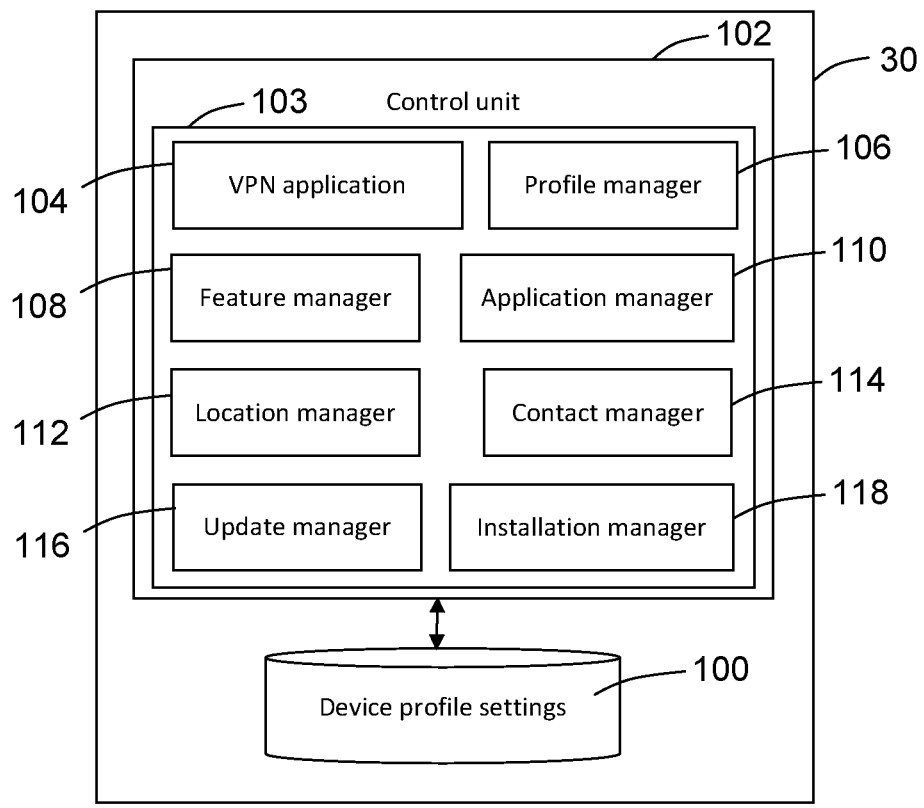
FIG. 5 is a block diagram of a controlled device of the device management system shown in FIG. 1.

Referring to FIG. 5, a controlled device, in this example a controlled smart phone 30, is shown diagrammatically.

The controlled device 30 includes stored device profile settings 100 that define configuration parameters for a virtual private network (VPN) to be used when the controlled device 30 connects to a wide area network 14 such as the Internet through a non-controlled access point 36 or a non-controlled mobile network 38. The device profile settings 100 also define usage policies, for example governing Internet access restrictions, usage of app and device features, location tracking and/or usage of contacts stored in the user device. The device profile settings 100 are essentially used by a usage control application 103 that is installed on a non-controlled user device to convert the user device to a controlled user device 30.

The usage control application 103 is implemented by a control unit 102 that may include a microprocessor and associated memory and any other component required to implement the functionality of the access control application 103.

The usage control application 103 implemented by the control unit 102 includes a VPN application 104 arranged to instigate a VPN connection automatically when the controlled device 30 requests to communicate with a wide area network 14 and the controlled device 30 is not connected to a controlled access point 22. If the controlled device 30 is connected to a controlled access point 22 or a controlled mobile network 24, network access control is provided by the controlled access point 22 or controlled mobile network 24 and access control does therefore not need to be provided by the controlled device 30. If the controlled device 30 connects through a non-controlled access point 36 or a non-controlled mobile network 38, the VPN application 104 ensures that all data traffic to and from the controlled device 30 passes through the VPN connection.

The usage control application 103 also includes a profile manager 106 arranged to manage the current device profile settings 100 stored on the controlled device 30, and to communicate with the MDM server 42 in order to identify and install updates to the application 103 and/or the device profile settings 100 as required.

The usage control application 103 also includes a feature manager 108 arranged to enforce feature blocking rules stored in the device profile settings 100. The feature blocking rules govern allowed usage of device features such as a device camera, screen capture feature or in-app purchases, for example so that a user is allowed to use a device camera during school time, but is not allowed to use the device camera after school.

The usage control application 103 also includes an application manager 110 arranged to identify installed applications on the controlled device 30 and enforce application blocking rules stored in the device profile settings 100 that govern usage of the applications, for example usage of social networking applications and/or games.

The usage control application 103 also includes a location manager 112 arranged to determine and store information indicative of the location of the device 30, for example using a GPS transceiver, incorporated into the controlled device 30, at intervals defined in the device profile settings 100, and a contact manager 114 arranged to maintain a locally stored contact list and enforce restrictions to telephone calls and text messages using the stored contact list and according to rules stored in the device profile settings 100.

The obtained location information may be stored, for example at the MDM server 42, and used by the system in order to provide an administrator associated with a user device with location related functions, for example that determine the current or previous location of a user associated with a user device, and/or track the movements of a user, and/or send a communication to a user device or an administrator when the user reaches a defined location or does not reach a defined location by a defined time, and/or that provide defined functionality such as whether to allow or deny particular device usage based on location.

The usage control application 103 also includes an update manager 116 arranged to periodically contact the access point control server 44 in order to determine whether updates are required, and an installation manager 118 that controls installation and removal of the usage control application 103.

The usage control application 103 may also be arranged to enable a user to override the policy defined for a user device and apply a policy set of another user not associated with the user device for a defined period of time by entering authentication details of the other user.

Figure 6:
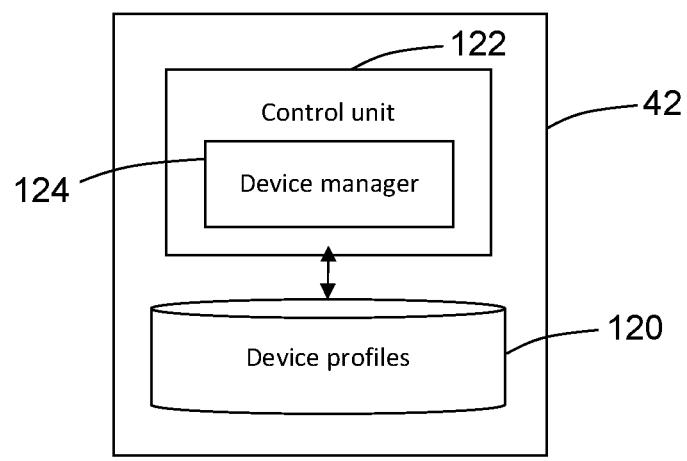
FIG. 6 is a block diagram of a MDM server of the device management system shown in FIG. 1.

Referring to FIG. 6, the MDM server 42 is shown diagrammatically.

The MDM server 42 includes stored device profiles 120 including default device profile settings and actual device profile settings for each mobile user device associated with the system, and a control unit 122 arranged to implement a device manager 124. The control unit 122 may include a microprocessor and associated memory and any other component as required to implement the functionality of the device manager 124.

The device manager 124 is arranged to coordinate communication with the mobile user devices, in particular in relation to managing updates at the mobile user devices.

Figure 7:
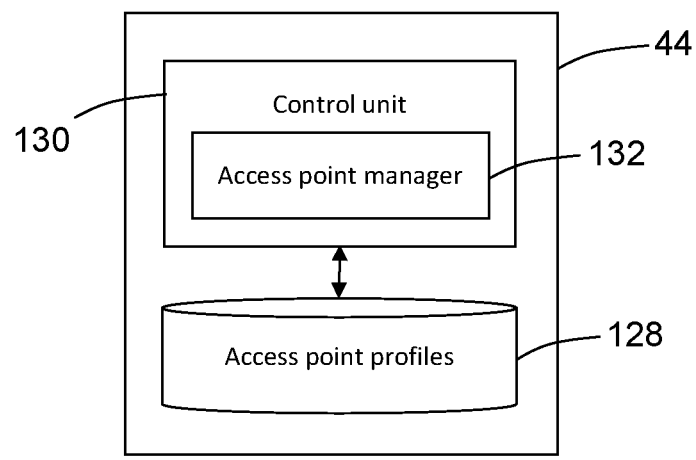
FIG. 7 is a block diagram of an access point control sever of the device management system shown in FIG. 1.

Referring to FIG. 7, an access point control server 44 is shown diagrammatically.

The access point control server 44 includes stored access point profiles 128 that define settings for each controlled access point 22 associated with the system.

The access point control server 44 also includes a control unit 130 arranged to control and coordinate operations at the access point control server 44, the control unit 130 implementing an access point manager 132 arranged to manage communication with controlled access points 22, in particular to manage storage of configuration settings at the controlled access points 22 and manage updates at the controlled access points 22.

The control unit 130 may include a microprocessor and associated memory and any other component as required to implement the functionality of the access point control server 44.

Figure 8:
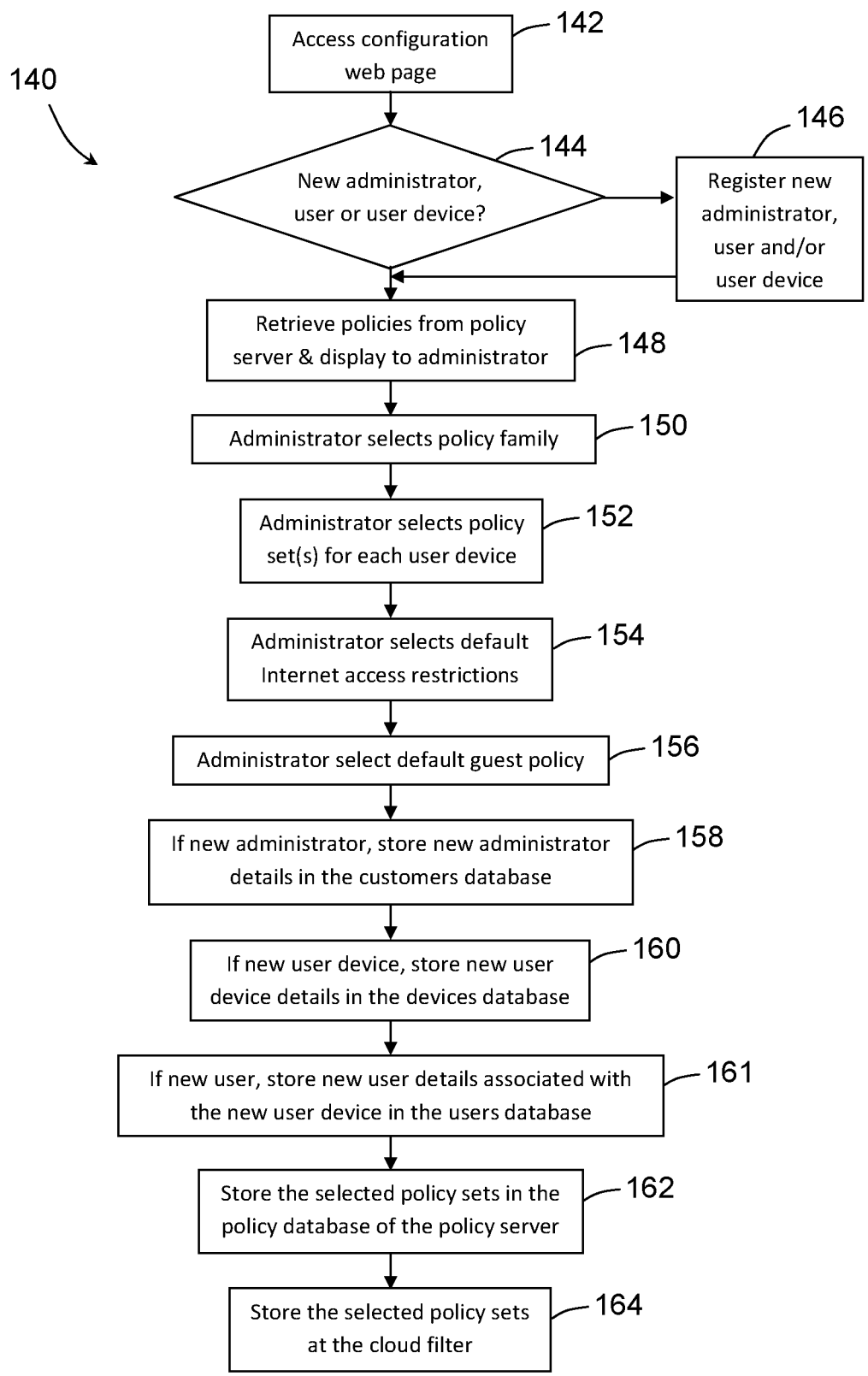
FIG. 8 is a flow diagram illustrating a user policy setup process of a method of managing network enabled devices in accordance with an embodiment of the present invention.

In order to configure the levels of usage permitted by a user device, an administrator responsible for the user of the user device follows a user policy setup process 140, as shown in FIG. 8.

The user policy setup process 140 is instigated when the administrator accesses 142 a configuration web page, in this example served to a web browser on the administrator terminal 66 by the web server 40.

If the user or administrator is a new administrator or user, the administrator is directed to a web page that allows the administrator to register with the system, and/or to register a new user and/or new user device with the system 144, 146.

For each new user device to be registered with the system, the administrator is presented 148 with predefined policies that are selectable and customisable by the administrator. From the displayed policies, the administrator selects 150 a policy family 80, and within the selected policy family 80 selects 152 one or more policy sets 82 for the user device. This may occur by selecting policy families and policy sets for particular users and associating the selected policy families and policy sets with user devices associated with the users. As indicated at steps 154 and 156, the administrator also selects the default Internet access restrictions (safety net policy) and the default guest policy.

If the administrator is new, the administrator details entered during registration are stored 158 in the customers' database 64 and, similarly, if a new user device has been registered, details of the new user device are stored 160 in the devices database 56. Also, if a new user has been registered, details of the new user associated with the new user device are stored 161 in the users database 54.

After selection of the policy family 80 and policy sets 82 for the new user device, the selected policy family 80 and policy sets 82 are stored as defined policies 88 in the policy database 74 of the policy server 46. The selected policies are also stored at the cloud filter 12.

The selected policy set(s) 82 may also be customised by the administrator as required.

It will be understood that since each selected policy family 80 and policy set(s) 82 are selected and optionally customised by the relevant administrator, each user device has a defined set of usage policies that are particular to the user device and linked with the user device by virtue of the unique identifier associated with the user device. As a consequence, the system is able to apply individually defined usage policies to each user device registered with the system.

In a variation to this, a user device may have two or more sets of usage policies, with the policy set to be used being determined according to defined criteria, such as the location of the user device determined according to the particular controlled access point 22 through which the user device connects to the Internet.

Figure 9:
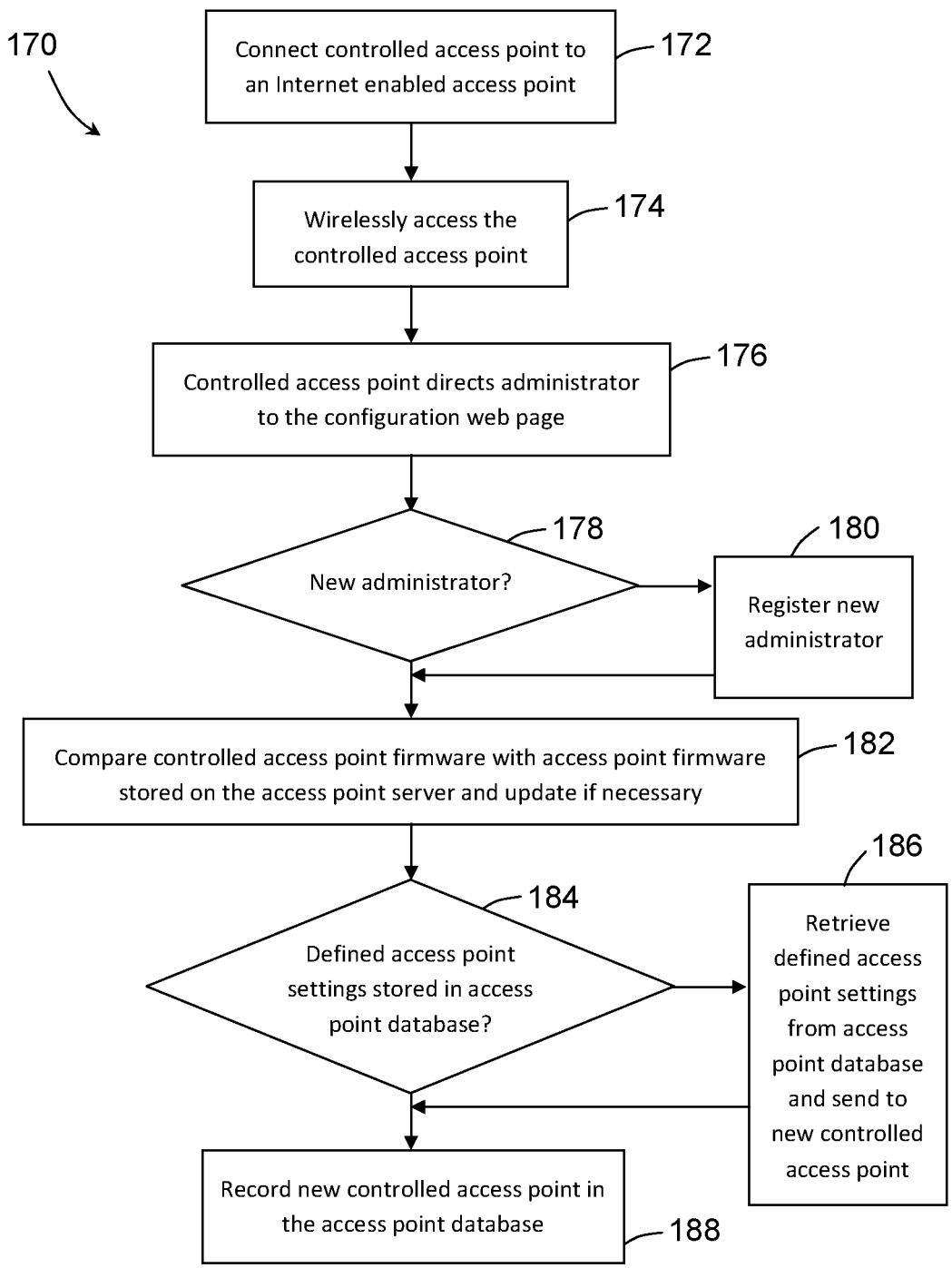
FIG. 9 is a flow diagram illustrating a controlled access point setup process of a method of managing a network enabled device in accordance with an embodiment of the present invention.

In order to register a new controlled access point 22 with the system, an administrator responsible for the controlled access point 22 follows a controlled access point setup process 170, as shown in FIG. 9.

The new controlled access point 22 is first connected 172 to an existing Internet enabled access point, and the administrator connects wirelessly 174 to the controlled access point 22, for example using the administrator terminal 66, which causes the controlled access point 22 to direct 176 the user device to the configuration web page served to a web browser on the administrator terminal by the web server 40.

If the administrator is new, details of the new administrator are entered in order to register 180 the new administrator with the system.

As indicated at steps 182, 184 and 186, the client application 96 of the access point control server 44 interrogates the new controlled access point 22 and determines whether the firmware stored at the controlled access point 22 is up to date. If not, the client application 96 downloads a firmware update and manages installation of the firmware update on the new controlled access point 22. The client application also interrogates the controlled access point 22 to determine whether the configuration settings for the controlled access point 22 are stored in the access point database 58, and if so, the client application 96 downloads the access point settings to the controlled access point 22 for storage as access point settings 90 at the controlled access point 22.

The controlled access point setup process 170 then involves recording information indicative of the new controlled access point 22, such as a MAC address of the controlled access point 22, in the access point database 58 and recording 188 in the access point database 58 an association between the new controlled access point 22 and the relevant administrator.

Figure 10:
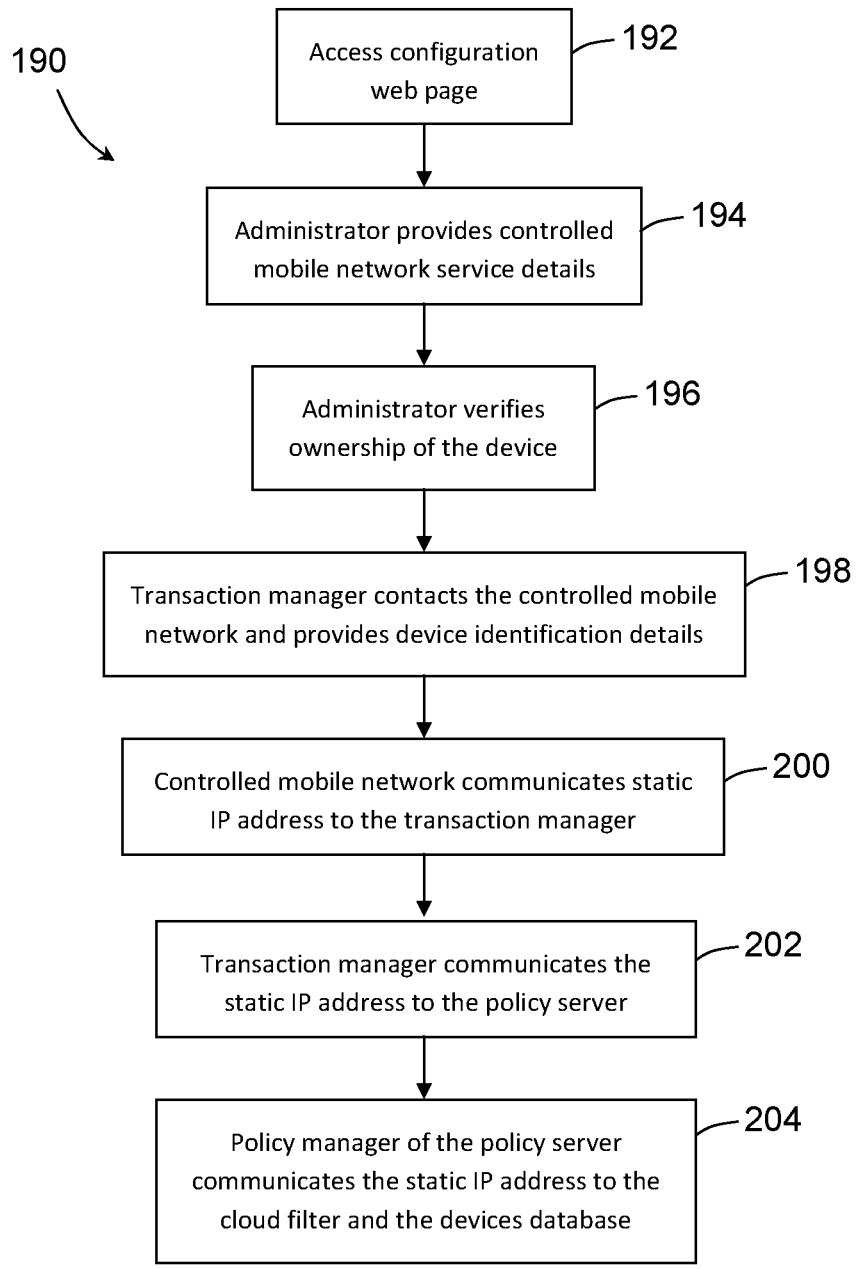
FIG. 10 is a flow diagram illustrating a controlled mobile service setup process of a method of managing a network enabled device in accordance with an embodiment of the present invention.

In order to register a new controlled mobile network service with the system, an administrator responsible for the user device that will use the controlled mobile network service follows a controlled mobile service setup process 190, as shown in FIG. 10.

The administrator accesses 192 the configuration web page served to a web browser on the administrator device 66 by the web server 40, provides details 194 of the controlled mobile network, and verifies ownership 196 of the device.

Ownership may be verified in any suitable way, for example by sending a text message including a registration code to the user device, and receiving the registration code from the user. The transaction manager 72 at the web server 44 then contacts the controlled mobile network 24 using a web service to configure the controlled mobile service, and the controlled mobile network 24 communicates 200 a static IP address to be associated with the user device to the transaction manager 72. In response, the transaction manager 72 communicates 202 the static IP address to the policy manager 78 of the policy server 46. The policy manager 78 then communicates 204 the static IP address to the cloud filter 12 for storage at the cloud filer 12, and also communicates the static IP address to the device control platform 10 for storage in the devices database 56.

It will be appreciated that by providing a user device with a static IP address, the user device is provided with a unique identifier that can be used to apply the defined usage policies for the user device, with the static IP address being used to associate the defined family access policy and access policy set(s) to the correct user device.

Figure 11:
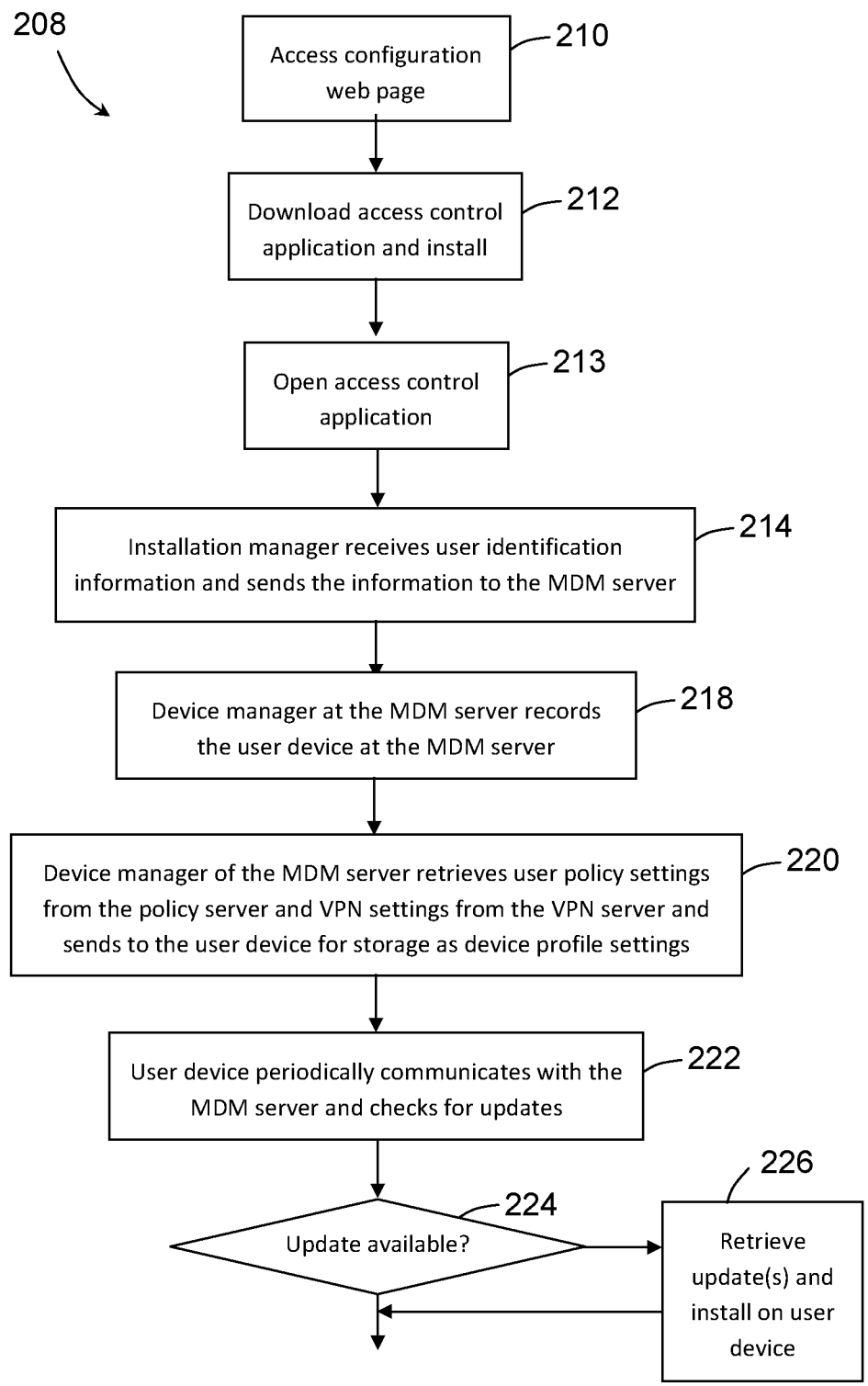
FIG. 11 is a flow diagram illustrating a controlled user device setup process of a method of managing a network enabled device in accordance with an embodiment of the present invention.

In order to register a new controlled user device 30, 32, 34 with the system, an administrator responsible for the controlled user device follows a controlled user device setup process 208, as shown in FIG. 11.

The administrator accesses 210 the configuration web page served to a web browser by the web server 40, for example using the administrator device 66, and the administrator downloads or instructs the owner of the user device to download a usage control application 103 to the user device and install 212 the usage control application 103 on the user device. After installation, the administrator or user opens 213 the usage control application 103 which initiates the installation manager 118 of the usage control application 103. The installation manager 118 requires the administrator or user to provide 214 user identification information, and the installation manager 118 forwards 214 the user identification information to the MDM server 42. The MDM server 42 then records 218 the controlled user device with the MDM server 42.

The device manager 124 of the MDM server 42 retrieves 220 relevant settings including usage policies to be applied to the user device from the policy server 46 and VPN settings stored at the VPN server 48, and stores 220 the relevant settings as device profile settings 100 at the controlled user device 30, 32, 34.

The installation manager 118 also sets up a device watchdog that periodically communicates with the MDM server 42 to check 222 for updates to the device profile settings 100 stored at the controlled user device and updates to the access control application 103, and manages updates as required 224, 226.

The installation manager also creates a service for the user device in the services database 60.

In order to cancel or suspend a controlled user device 30, 32, 34, the administrator accesses the configuration web page and communicates to the transaction manager 72 that the registration of the controlled user device should be removed from the system. The transaction manager 72 then communicates the desired change to the device manager 124 at the MDM server 42. In this way, when the device watchdog communicates with the MDM server 42 to check 222 for updates, the device manager 124 indicates to the controlled user device that the user device is no longer registered with the system, and the installation manager 118 at the controlled user device 30, 32, 34 uninstalls the usage control application 103.

It will be appreciated that during use usage policies may be applied to a user device by the present system by a controlled access point 22, by a controlled mobile network 24, or by a controlled user device 30, 32, 34 and examples of each will now be described.

Figure 12A:
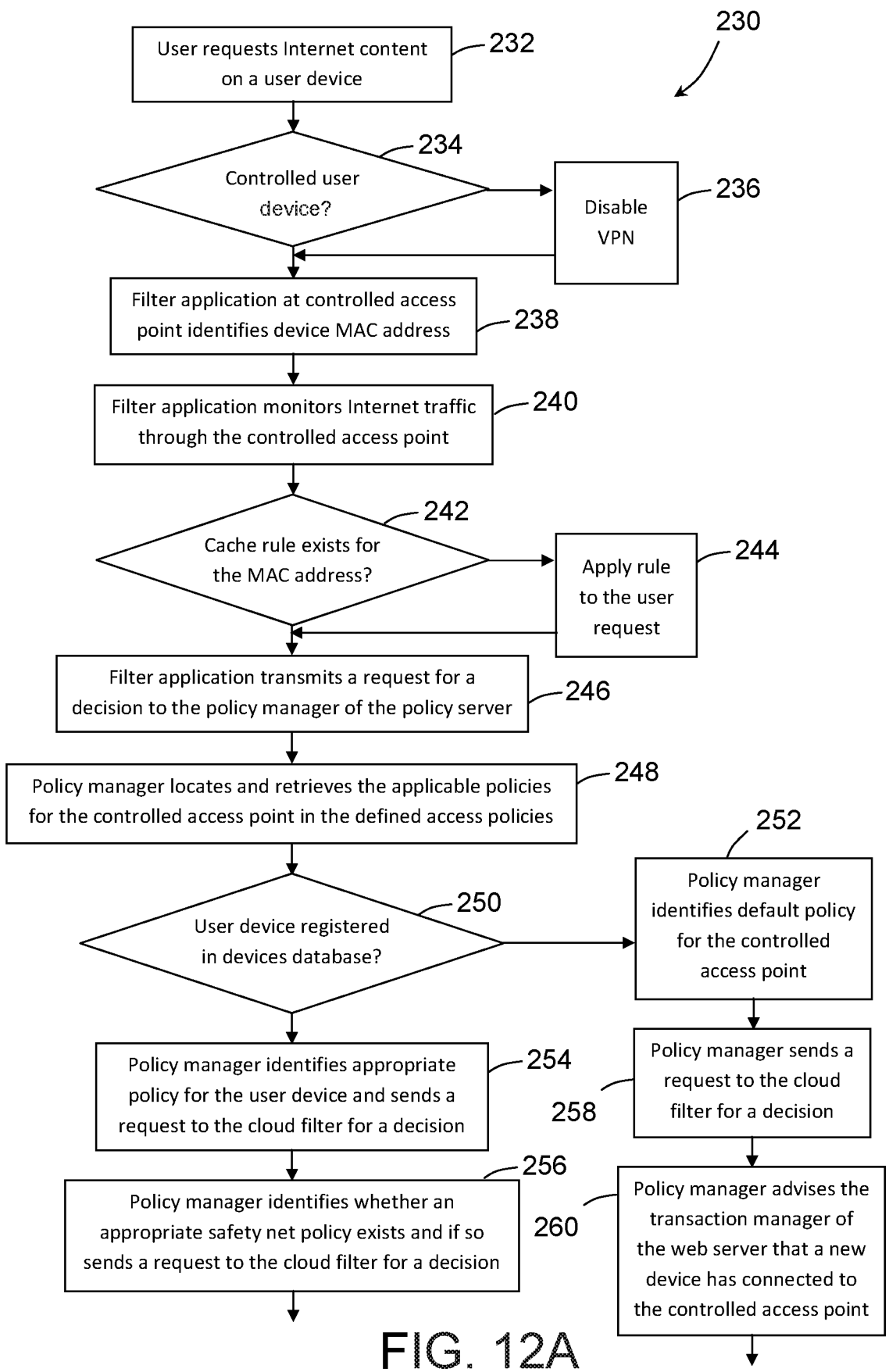
FIGS. 12A and 12B are a flow diagram illustrating a controlled access point filtering process of a method of managing a network enabled device in accordance with an embodiment of the present invention.

An example filtering process 230 for a user device desiring to use a controlled access point 22 to access the Internet is shown in FIG. 12A.

The process 230 commences when a user of the user device requests access 232 to the wide area network 14 from the user device. If the user device is a controlled user device 30, 32, 34, then the VPN server 48 does not create a VPN connection 234, 236.

The filter application 98 at the controlled access point 22 identifies 238 a unique identifier associated with the user device, such as a MAC address of the user device, and also monitors 240 data traffic passing between the controlled access point 22 and the user device. If a currently applicable cached usage rule 92 exists for the user device MAC address at the controlled access point, then the rule is applied 244 to the data traffic.

If a cached rule does not exist, then the filter application transmits a request 246 to the policy manager 78 of the policy server 46 for a decision as to whether the access request should be allowed.

On receipt of the request for a decision, the policy manager 78 retrieves 248 the applicable usage policies that have been defined for the user device identified by the user device MAC address from the defined usage policies 88.

If the user device is already registered 250 with the system, the MAC address will be recorded in the devices database 56 and defined usage policies 88 will exist for the user device in the policy server 46. Based on the defined usage policies for the user device, a request 254 is sent to the cloud filter 12 for a decision. In addition, the policy manager 78 identifies 256 whether an appropriate safety net policy exists and if so sends a request to the cloud filter 12 for a decision.

Figure 12B:
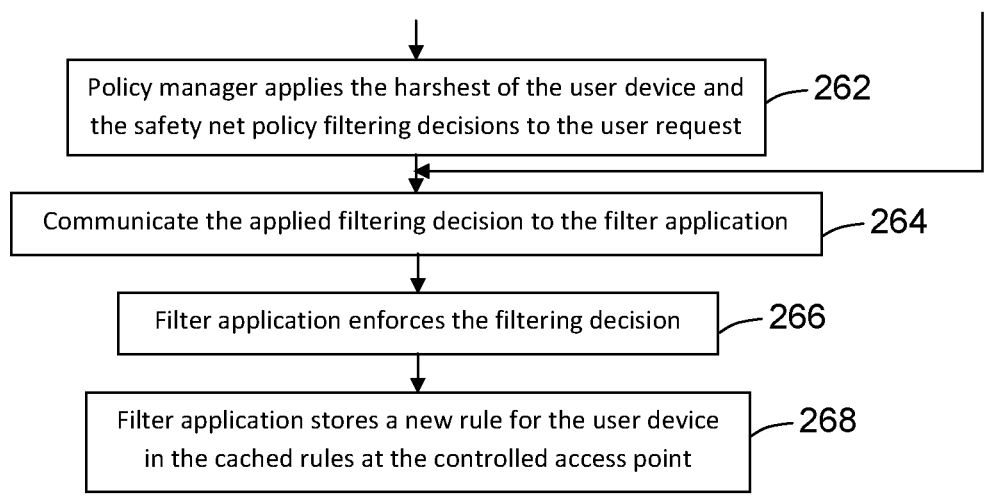

In FIG. 12B the policy manager 78 applies 262 the harshest of the defined usage policies and the safety net policy to the user request. The access decision is then communicated 262 to the filter application 98, and the filter application 98 enforces 266 the decision. The filter application 98 also stores a new rule for the user device in the cached rules 92 stored at the controlled access point 22.

It will be understood that since two decisions in relation to access are required to be made by the cloud filter 12, that is, in relation to the defined usage policies 82 and the safety net policy 84, the access decisions made by the cloud filter 12 are passed back to the policy manager 78 to make a determination as to whether access is granted, and if so, the level of access to grant, based on the two decisions.

If the user device is not already registered 250 with the system, the policy manager 78 identifies 252 the default access policy for the controlled access point 22 and sends a request 258 to the cloud filter 12 for a decision. The policy manager 78 also advises 260 the transaction manager 72 of the web server 40 that a new device has connected to the controlled access point.

In a particular example, a user of a smartphone is in primary school and a policy set is defined according to a senior primary policy set within Policy Family "Catholic Education". The senior primary policy set in this example specifies that the user is not able to access the Internet unless the day is a weekday and the time of day is 3 pm-5 pm, or the day is on the weekend. The user attempts to access the Internet at 2 pm on a weekday but is restricted by the usage policy stored for the user device at the controlled access point 22.

Figure 13:
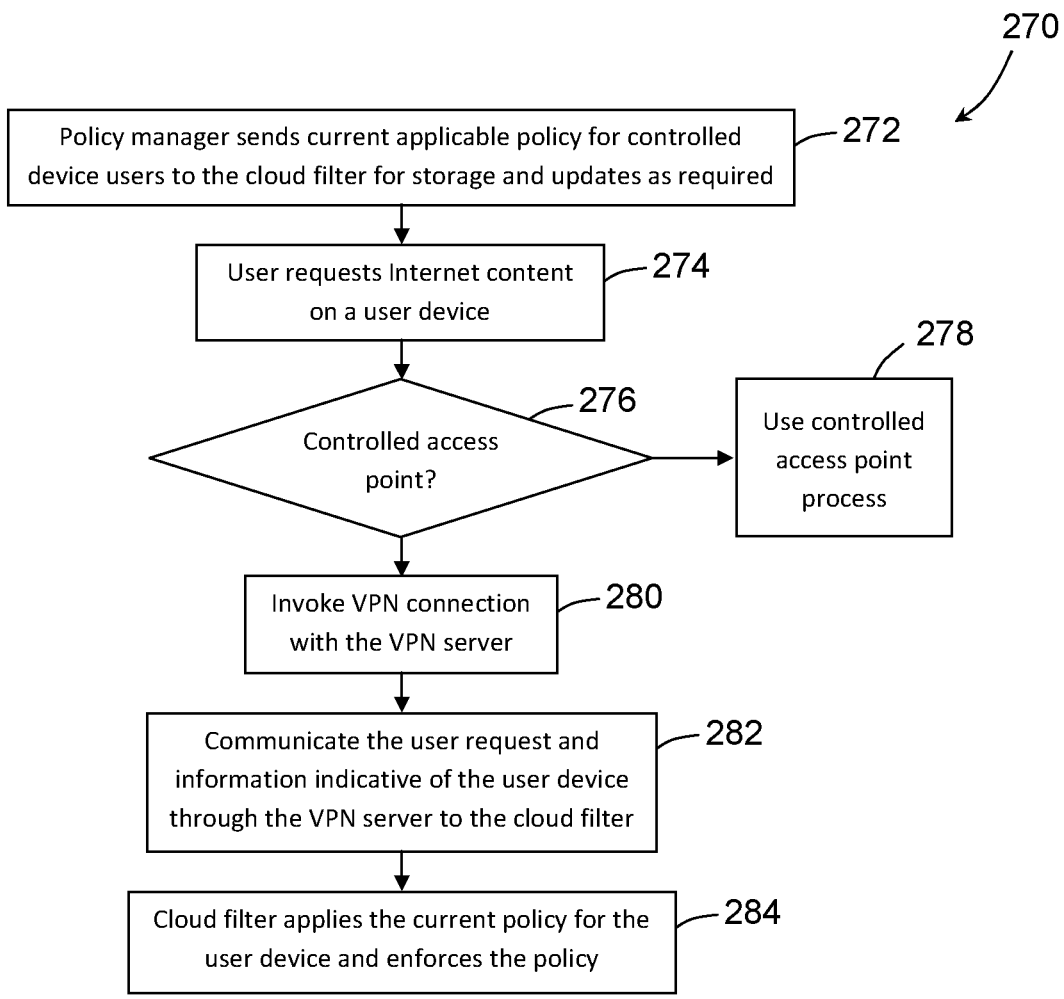
FIG. 13 is a flow diagram illustrating a controlled user device filtering process of a method of managing a network enabled device in accordance with an embodiment of the present invention.

An example filtering process 270 for a controlled user device 30, 32, 34 is shown in FIG. 13.

On an ongoing basis, the policy manager 78 at the policy server 46 sends the current applicable policy for the controlled user device to the cloud filter 12 for storage. For example, as the current applicable policy set 82 changes for a user because of the time of day, the policy manager 78 sends an update 272 to the cloud filter 12 so that the cloud filter 12 has an up to date policy for each controlled user device. Accordingly, with a controlled user device, decisions in relation to access control are made by the cloud filter 12.

A user of the controlled user device 30, 32, 34 requests access 274 to the wide area network 14 from the user device. If the user device is connecting to the wide area network through a controlled access point 22, the controlled access point takes precedence and access control is managed 278 by the controlled access point 22 instead of by the controlled user device 30, 32, 34.

If the user device is not connecting to the wide area network 14 through a controlled access point 22, the VPN application 104 of the access control application 103 invokes a VPN connection between the controlled user device and the VPN server 48 at the device control platform 10 so that communications between the controlled user device and the device control platform 10 are secure. The VPN server 48 identifies the controlled user device using the VPN credentials used by the controlled user device and communicates 282 the usage request and information indicative of the controlled user device to the cloud filter 12. The cloud filter 12 then applies the current usage policy applicable for the controlled user device 30, 32, 34.

In a particular example, a user of a controlled device, in this example a smartphone, is in primary school and a policy set "Junior High School" within the policy family "Catholic Education" has been defined. The Junior High School policy set defines a daily routine for the user such during school time (8 am-3 pm) the user is not permitted to access any Internet content, apps or controlled device features and may only make or receive calls to and from emergency numbers including the user's parents; and after school between 3 pm and 5 pm a 'play time' period is defined wherein the user is permitted to access specific Internet content and specific apps defined in the Junior High School usage policy. In this example, Facebook and certain device features are allowed during 'play time', although the user remains restricted to making or receiving calls to & from emergency numbers including his/her parents.

During school, the user attempts to access Facebook via an Internet browser on the user's smartphone. The usage control application 103 on the user's smartphone will deny access in accordance with the Junior High School usage policy and the user will instead be directed to a denied access web page. If the user then attempts to gain access to Facebook via a Facebook app, the usage control application 103 on the user's smartphone will deny usage of the app in accordance with the Junior High School usage policy and prevent opening of the Facebook app. However, as the Junior High School usage policy for the user device allows Facebook usage during 'play time', an attempt by the user to access Facebook during 'play time' will be allowed.

Figure 14:
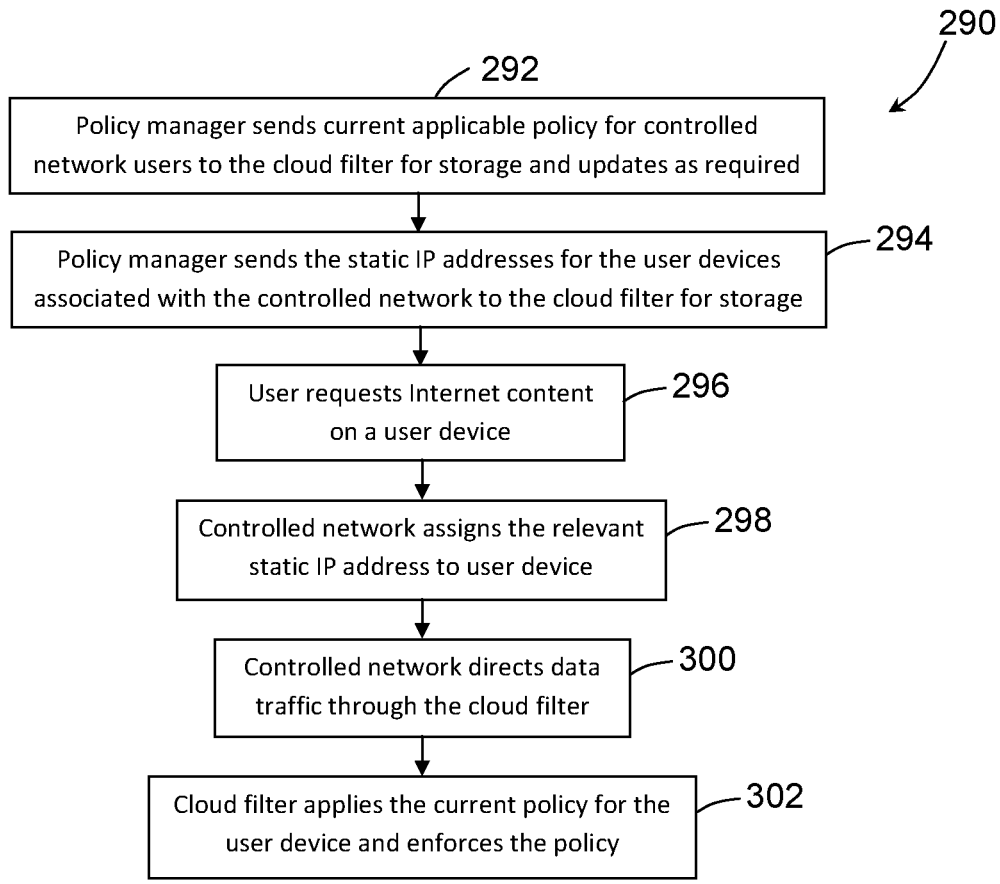
FIG. 14 is a flow diagram illustrating a controlled network filtering process of a method of managing a network enabled device in accordance with an embodiment of the present invention.

An example filtering process 290 for an uncontrolled user device 16, 18, 20 that connects to the wide area network 14 using a controlled mobile network 24 is shown in FIG. 14.

On an ongoing basis, the policy manager 78 at the policy server 46 sends 292 the current applicable policy for the user device to the cloud filter 12 for storage. For example, as the current applicable policy set 82 changes for a user because of the time of day, the policy manager 78 sends an update 272 to the cloud filter 12 so that the cloud filter 12 has an up to date policy for each controlled user device. Accordingly, with a user device that connects to a wide area network 14 through a controlled mobile network 24, decisions in relation to usage control are made by the cloud filter 12.

The policy manager 78 also sends 294 information indicative of the static IP address of the user device to the cloud filter 12 for storage so that the cloud filter can uniquely identify the user device.

A user of the uncontrolled user device 16, 18, 20 requests access 296 to the wide area network 14 from the user device through the controlled mobile network 24, and in response the controlled mobile network allocates 298 the static IP address to the user device. The controlled mobile network 24 directs 300 all data traffic through the cloud filter 12, and the cloud filter 12 applies the current usage policy applicable for the uncontrolled user device 1, 18, 20.

Modifications and variations as would be apparent to a skilled addressee are deemed to be within the scope of the present invention.

What is claimed is:

1. A system for managing Internet usage of at least one network enabled device, the system comprising:
    a policy storage device arranged to store information indicative of at least one usage policy set applicable to at least one user device, each usage policy set defining Internet usage permissions and/or Internet usage restrictions for each of the at least one user device, set for the user device, established to apply to the user device independent of and across any network the user device may connect to, and managed by at least one authorized user; and
    one or more hardware processors arranged to:
        communicate with a usage control application included on the user device, the usage control application arranged to:
            communicate a request from the user device to use the Internet,
            seek a decision from a policy server regarding whether the user device is permitted or restricted from using the Internet as requested according to the policy storage device, and
            permit the requested Internet usage by the user device where permitted, and restrict or block the requested Internet usage by the user device where restricted;
        store user device identification information for each user device associated with the system, the user device identification information being indicative of and unique to a user device associated with the system and being stored separately relative to the user device;
        associate a usage policy set in the policy storage device with the user device using the user device identification information unique to the user device;
        facilitate access through the Internet by at least one authorized user to the usage policy set associated with the user device from a remote location to enable the at least one authorized user to define Internet usage permissions and/or Internet usage restrictions for the user device;
        on an attempt by the user device to connect to the Internet:
            establish a virtual private network (VPN) connection through a VPN application installed on the user device to a remote VPN server,
            intercept a request from the user device to use the Internet, seek a real time decision from the policy server regarding whether the user device is permitted or restricted from using the Internet as requested at that time according to the policy storage device,
            permit the requested Internet usage by the user device through the VPN where permitted; and
            restrict or block the requested Internet usage by the user device where restricted.

2. A system as claimed in claim 1, wherein the user device identification information indicative of and unique to at least one user device associated with the system includes a MAC address, a SIM card number, an IMEI number, a mobile telephone number of the user device, or a static IP address assigned to the user device.

3. A system as claimed in claim 1, wherein the system includes a plurality of different predefined usage policies, and the system is arranged to enable an authorized user to select at least one usage policy applicable to a particular network connection, a particular user, and/or a particular user device from the plurality of different predefined usage policies, and to modify any of the at least one usage policy set to their chosen settings.

4. A system as claimed in claim 1, wherein the one or more hardware processors is arranged to make a decision on whether to permit or restrict an Internet usage request through applying the most restrictive policy included in the at least one usage policy set, as modified by an authorized user, applicable at that time based on a network connection, user, and/or user device.

5. A system as claimed in claim 1, wherein the usage control application is adapted to detect whether the user device is connected to a network which is subject to filtering services provided by the system and disable function(s) thereof.

6. A system as claimed in claim 3, wherein the one or more hardware processors are arranged to enable the at least one authorized user to modify a selected usage policy, and in response to modification of a selected usage policy by the at least one authorized user, the system does not automatically apply the modified usage policy to other user devices.

7. A system as claimed in claim 1, wherein at least one user device has multiple defined user policy sets that are selectable for use with the user device to determine whether to permit or restrict an Internet usage request, and the system is arranged such that the usage policy set to be used with the user device is selected based on defined criteria.

8. A system as claimed in claim 1, comprising an access point arranged to facilitate access to a wide area network, the access point arranged to enforce usage permissions and/or usage restrictions for the user device according to the at least one usage policy set associated with the user device.

9. A system as claimed in claim 8, wherein the access point is arranged to identify the user device based on the user device identification information indicative of and unique to the user device, and to use the at least one usage policy set stored for the user device to enforce the usage permissions and/or usage restrictions for the user device.

10. A system as claimed in claim 8, wherein the usage policy set to be used with the user device is selected based on the access point.

11. A system as claimed in claim 8, wherein the access point is arranged to store information indicative of decisions already made in relation to usage permissions and/or usage restrictions for the user device, and to apply the stored decisions to subsequent usage requests from the user device.

12. A system as claimed in claim 8, wherein the system includes defined usage policies, wherein the defined usage policies include a safety net policy that defines minimum access restrictions to the wide area network to be applied by the access point for user devices connected to the access point and associated with the system but not associated with an administrator of the access point, and/or the defined usage policies include a guest policy that defines access permissions and/or restrictions to the wide area network to be applied by the access point for user devices connected to the access point that are not registered with the system.

13. A system as claimed in claim 1, wherein the user device comprises a controlled user device, the usage control application installed on the controlled user device and arranged to communicate network access requests to a cloud filter.

14. A system as claimed in claim 13, wherein the usage control application is arranged to enforce rules in relation to usage of applications installed on the user device and/or features of the user device based on the usage policy for the user device.

15. A method of managing Internet usage of at least one network enabled user device, the method comprising:
    storing policy storage information indicative of at least one usage policy set applicable to at least one user device, each usage policy set defining Internet usage permissions and/or Internet usage restrictions for each of the at least one user device, set for the user device, established to apply to the user device independent of and across any network the user device may connect to, and managed by at least one authorized user;
    controlling a user device using a usage control application included on the user device and arranged to communicate a request from the user device to use the Internet, seek a decision from a policy server regarding whether the user device is permitted or restricted from using the Internet as requested according to the policy storage information, and permit the requested Internet usage by the user device where permitted, and restrict or block the requested Internet usage by the user device where restricted;
    storing, by one or more hardware processors, user device identification information for each user device separately relative to the user device, the user device identification information being indicative of and unique to the user device;
    associating, by the one or more hardware processors, a usage policy set of the at least one usage policy set with the user device using the user device identification information unique to the user device associated with a system; and
    facilitating, by the one or more hardware processors, access through the Internet by at least one authorized user to the at least one usage policy set associated with the user device from a remote location to enable the at least one authorized user to define Internet usage permissions and/or Internet usage restrictions for the user device;
    on an attempt by the user device to connect to the Internet:
        establishing, by the one or more hardware processors, a virtual private network (VPN) connection through a VPN application installed on the user device to a remote VPN server;
        intercepting, by the one or more hardware processors, a request from the user device to use the Internet;
        seeking, by the one or more hardware processors, a real time decision from the policy server regarding whether the user device is permitted or restricted from using the Internet as requested at that time according to the policy storage information; and
        permitting, by the one or more hardware processors, the requested Internet usage by the user device through the VPN where permitted, and restricting or blocking the requested Internet usage by the user device where restricted.

16. A method as claimed in claim 15, wherein the user device identification information indicative of and unique to at least one user device associated with the system includes a MAC address, a SIM card number, an IMEI number, a mobile telephone number of the user device, or a static IP address assigned to the user device.

17. A method as claimed in claim 15, comprising providing a plurality of different predefined usage policies, and enabling an authorized user to select at least one usage policy applicable to a particular network connection, a particular user, and/or a particular user device from the plurality of different predefined usage policies, and to modify any of the at least one usage policy set to their chosen settings.

18. A method as claimed in claim 15, wherein the usage control application is adapted to detect whether the user device is connected to a network which is subject to filtering services provided by the system and disable function(s) thereof.

19. A method as claimed in claim 15, comprising providing the user device with multiple defined usage policy sets that are usable with the user device to determine whether to permit or restrict an Internet usage request, and selecting the defined usage policy set to be used with the user device based on defined criteria.

20. A method as claimed in claim 15, comprising enforcing usage permissions and/or usage restrictions for the user device at an access point arranged to facilitate access to a wide area network according to the at least one usage policy set associated with the user device.

21. A method as claimed in claim 20, comprising identifying the user device based on the user device identification information indicative of and unique to the user device at the access point, and using at least one stored usage policy for the user device to enforce the usage permissions and/or usage restrictions for the user device at the access point.

22. A method as claimed in claim 20, wherein the defined usage policy set that is used with the user device is selected based on the access point.

23. A method as claimed in claim 15, wherein the system includes defined usage policies, wherein the defined usage policies include a safety net policy that defines minimum access restrictions to a wide area network to be applied by an access point for user devices connected to the access point and associated with the system but not associated with an administrator of the access point, and/or a guest policy that defines access permissions and/or restrictions to the wide area network to be applied by the access point for user devices connected to the access point that are not registered with the system.

24. A method as claimed in claim 15, wherein the usage control application is installed on the user device.

25. A method as claimed in claim 24, comprising enforcing rules by the usage control application in relation to usage of applications installed on the user device and/or features of the user device based on the usage policy set associated with the user device.

26. A method as claimed in claim 15, comprising determining a location of the user device and storing location information indicative of device location.

27. A method of managing Internet usage of at least one network enabled user device, the method comprising:
storing policy storage information indicative of at least one usage policy set applicable to at least one user device, each usage policy set defining Internet usage permissions and/or Internet usage restrictions for each of the at least one user device, set for the user device, established to apply to the user device independent of and across any network the user device may connect to, and managed by at least one authorized user;
controlling a user device using a usage control application included on the user device and arranged to communicate a request from the user device to use the Internet, seek a decision from a policy server regarding whether the user device is permitted or restricted from using the Internet as requested according to the policy storage information, and permit the requested Internet usage by the user device where permitted, and restrict or block the requested Internet usage by the user device where restricted;
storing, by one or more hardware processors, user device identification information for each user device separately relative to the user device, the user device identification information being indicative of and unique to the user device;
associating, by the one or more hardware processors, a usage policy set of the at least one usage policy set with the user device using the user device identification information unique to the user device associated with a system;
facilitating, by the one or more hardware processors, access through the Internet by at least one authorized user to the at least one usage policy set associated with the user device from a remote location to enable the at least one authorized user to define Internet usage permissions and/or Internet usage restrictions for the user device; and
allocating, by the one or more hardware processors, a static IP address to the user device when the user device connects to a mobile network; and
communicating, by the one or more hardware processors, the static IP address to a cloud filter, the cloud filter enforcing usage permissions and/or usage restrictions for the user device according to the at least one usage policy set associated with the user device identified using the static IP address.

28. A system as claimed in claim 1, wherein the usage control application is arranged to store with an expiry period set by an authorized user of the system a cache of decisions previously made in relation to Internet usage permissions and/or Internet usage restrictions and apply these to subsequently communicated Internet usage requests from the user device until expired.

29. A system as claimed in claim 1, wherein the decision is made in real time.

30. A system as claimed in claim 1, wherein the usage control application is arranged to intercept and then communicate the request from the user device to use the Internet.

31. A system as claimed in claim 1, wherein the usage control application is further arranged, when a restricted decision has been made, to notify a user of the user device through a web page or notification that the requested Internet usage has been restricted.

32. A system for managing Internet usage of at least one network enabled device, the system comprising:
a policy storage device arranged to store information indicative of at least one usage policy set applicable to at least one user device, each usage policy set defining Internet usage permissions and/or Internet usage restrictions for each of the at least one user device, set for the user device, established to apply to the user device independent of and across any network the user device may connect to, and managed by at least one authorized user; and
one or more hardware processors arranged to:
communicate with a usage control application included on the user device, the usage control application arranged to:
communicate a request from the user device to use the Internet,
seek a decision from a policy server regarding whether the user device is permitted or restricted from using the Internet as requested according to the policy storage device, and
permit the requested Internet usage by the user device where permitted, and restrict or block the requested Internet usage by the user device where restricted;
store user device identification information for each user device associated with the system, the user device identification information being indicative of and unique to a user device associated with the system and being stored separately relative to the user device;
associate a usage policy set in the policy storage device with the user device using the user device identification information unique to the user device;
facilitate access through the Internet by at least one authorized user to the usage policy set associated with the user device from a remote location to enable the at least one authorized user to define Internet usage permissions and/or Internet usage restrictions for the user device;
allocate a static IP address to the user device when the user device connects to a mobile network; and
communicate the static IP address to a cloud filter, the cloud filter enforcing usage permissions and/or usage restrictions for the user device according to the at least one usage policy set associated with the user device identified using the static IP address.

* * * * *